US008639755B2

(12) United States Patent
Kogan et al.

(10) Patent No.: US 8,639,755 B2
(45) Date of Patent: Jan. 28, 2014

(54) SYSTEM AND METHOD OF MANAGING REAL-TIME COMMUNICATIONS USING CONTEXT-BASED AWARENESS STATES

(75) Inventors: Sandra L. Kogan, Newton, MA (US); James P. Galvin, Oak Ridge, NC (US); Kevin Solie, Lexington, KY (US); Ronald E. Pontrich, Jr., Lexington, KY (US); Amy D. Travis, Arlington, MA (US); Duncan Lear Mewherter, Newburyport, MA (US)

(73) Assignee: International Business Machines Corporation, Armonk, NY (US)

( * ) Notice: Subject to any disclaimer, the term of this patent is extended or adjusted under 35 U.S.C. 154(b) by 1496 days.

(21) Appl. No.: 11/335,034

(22) Filed: Jan. 19, 2006

(65) Prior Publication Data
US 2006/0168073 A1 Jul. 27, 2006

Related U.S. Application Data

(63) Continuation-in-part of application No. 10/738,246, filed on Dec. 17, 2003.

(51) Int. Cl.
G06F 15/16 (2006.01)
(52) U.S. Cl.
USPC ........................................................ 709/204
(58) Field of Classification Search
USPC ............ 709/204; 715/752; 707/102; 370/352
See application file for complete search history.

(56) References Cited

U.S. PATENT DOCUMENTS

| 6,668,173 | B2 * | 12/2003 | Greene .......................... 455/445 |
| 6,697,840 | B1 * | 2/2004 | Godefroid et al. ............ 709/205 |
| 6,714,519 | B2 * | 3/2004 | Luzzatti et al. ............... 370/252 |
| 6,981,223 | B2 | 12/2005 | Becker et al. |
| 6,990,513 | B2 * | 1/2006 | Belfiore et al. ............... 709/203 |
| 6,993,327 | B2 | 1/2006 | Mathis |
| 7,117,445 | B2 * | 10/2006 | Berger .......................... 715/752 |
| 7,117,455 | B2 | 10/2006 | Walker et al. |
| 7,184,524 | B2 * | 2/2007 | Digate et al. ............... 379/88.17 |
| 2002/0087704 | A1 * | 7/2002 | Chesnais et al. .............. 709/228 |

(Continued)

FOREIGN PATENT DOCUMENTS

WO WO 2004/112315 12/2004

OTHER PUBLICATIONS

"Awareness of Presence, Instant Messaging and WebWho" by Peter Ljungstrand and Yiva Hard af Segerstad SIGIGROUP Bulletin Dec. 2000 vol. 21, No. 3 pp. 21-27.*

(Continued)

*Primary Examiner* — Ashok Patel
*Assistant Examiner* — Lawrence Cosby
(74) *Attorney, Agent, or Firm* — Guerin & Rodriguez, LLP

(57) ABSTRACT

Described are a system and method for managing online communications by a user who participates in an awareness service system. A first awareness state associated with the user is published to a first participant of the awareness service system, while a second different awareness state associated with the user is published to a second participant of the awareness service system. Each published awareness state is based on a collaborative relationship between the user and the participant to which that awareness state is published.

24 Claims, 3 Drawing Sheets

(56) References Cited

U.S. PATENT DOCUMENTS

| | | |
|---|---|---|
| 2003/0014491 A1 | 1/2003 | Horvitz et al. |
| 2003/0217098 A1 | 11/2003 | Bobde et al. |
| 2004/0177118 A1 | 9/2004 | Mason et al. |
| 2004/0215737 A1 | 10/2004 | Della Pasqua |
| 2004/0267887 A1 | 12/2004 | Berger et al. |
| 2005/0071426 A1 | 3/2005 | Shah |
| 2005/0071506 A1 | 3/2005 | Hettish |
| 2005/0086311 A1 | 4/2005 | Enete et al. |
| 2005/0108341 A1 | 5/2005 | Mathew et al. |
| 2006/0190525 A1 | 8/2006 | Bobde et al. |

OTHER PUBLICATIONS

Non-Final Office Action dated May 1, 2007 for related U.S. Appl. No. 10/738,246.
Final Office Action dated Oct. 16, 2007 for related U.S. Appl. No. 10/738,246.
Non-Final Office Action dated Apr. 29, 2008 for related U.S. Appl. No. 10/738,246.
Non-Final Office Action dated Dec. 8, 2008 for related U.S. Appl. No. 10/738,246.
Examiners Answer dated May 28, 2010 for related U.S. Appl. No. 10/738,246.

* cited by examiner ately notified of the message. In addition, instant messaging systems typically employ "buddy lists" or "contact lists" by which users may specify individuals with which they prefer to exchange instant messages and for which they desire notification whenever an individual on the list comes online.

SYSTEM AND METHOD OF MANAGING REAL-TIME COMMUNICATIONS USING CONTEXT-BASED AWARENESS STATES

RELATED APPLICATION

This patent application is a continuation-in-part application claiming priority to co-pending U.S. patent application Ser. No. 10/738,246, filed on Dec. 17, 2003, and titled "Ability to Scope Awareness to Your Current Task," by Galvin et al., the entirety of which application is incorporated by reference herein.

FIELD OF THE INVENTION

The invention relates generally to communications among computing systems. More specifically, the invention relates to the use of context-based awareness states in awareness service systems, such as instant messaging systems and web conferencing systems.

BACKGROUND

Instant messaging has become a popular form of communication among employers, employees, customers, clients, colleagues, and students. In general, instant messaging is a form of electronic communication involving real-time communication between two or more users who are concurrently connected to a network (e.g., an intranet, the Internet). When one user sends an instant message to another user, the receiver is instantly notified of the message. In addition, instant messaging systems typically employ "buddy lists" or "contact lists" by which users may specify individuals with which they prefer to exchange instant messages and for which they desire notification whenever an individual on the list comes online.

These buddy lists or contact lists also serve as mechanisms by which a user can monitor the online status of those specified individuals. When activated, a buddy list displays whether or not a listed individual is online (e.g., through a change in color of the name and icon), thus making the user "aware" of the presence of other people. The user can then send instant messages to those individuals. Accordingly, an instant messaging system is an example of a system that provides an awareness service. Other examples of systems that can provide awareness services include web conferencing systems and document sharing systems.

Many users of instant messaging, though, complain of receiving a high number of interruptions throughout the day. To avoid the interruptions, some users choose not to log onto their instant messaging system, or to log on only during those periods when their schedules allow for interruptions. By not logging on, however, these users may miss important or urgent communications. Some instant messaging systems recognize this potential for frequent distractions and allow the user to publish (i.e., make known online to others logged onto the instant messaging system) that the user is busy. Such systems, however, are all-or-nothing; after posting a "Do Not Disturb," the user receives no instant messages from anyone, including people from whom the user would welcome a communication. Some systems provide a way to specify a list of certain people who can see when the user is online (i.e., by specifically listing those people who can see ("only the following list of people can see") or those who cannot see ("everybody can see except the following list of people"). This list, however, needs to be configured each time the user logs on. The settings cannot be saved or used with groups or with a calendar and cannot be used differently in different contexts.

SUMMARY

In one aspect, the invention features a computerized method for managing communications by a user of a computing device who participates in an awareness service system. The method comprises publishing a first awareness state associated with the user to a first participant of the awareness service system, while publishing a second different awareness state associated with the user to a second participant of the awareness service system. Each published awareness state is based on a collaborative relationship between the user and the participant to which that awareness state is published.

In another aspect, the invention features an awareness service system. The awareness service system comprises an instant messaging system that publishes a first awareness state associated with a user to a first participant of the awareness service system, while publishing a second different awareness state associated with the user to a second participant of the awareness service system. Each published awareness state is based on a collaborative relationship between the user and the participant to which that awareness state is published.

In still another aspect, the invention features a computer program product for use with a computer system in managing communications by a user of a computing device who participates in an instant messaging system. The computer program product comprises a computer useable medium having embodied therein program code. The program code includes program code for publishing a first awareness state associated with the user to a first participant of the awareness service system, while publishing a second different awareness state associated with the user to a second participant of the awareness service system. Each published awareness state is based on a collaborative relationship between the user and the participant to which that awareness state is published.

In still yet another aspect, the invention features a computer data signal embodied in a carrier wave for use with a computer system for managing communications by a user of a computing device who participates in an instant messaging system. The computer system has a display and is capable of generating a user interface through which a user may interact with the computer system. The computer data signal includes program code for publishing a first awareness state associated with the user to a first participant of the awareness service system, while publishing a second different awareness state associated with the user to a second participant of the awareness service system. Each published awareness state is based on a collaborative relationship between the user and the participant to which that awareness state is published.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Figure 1:
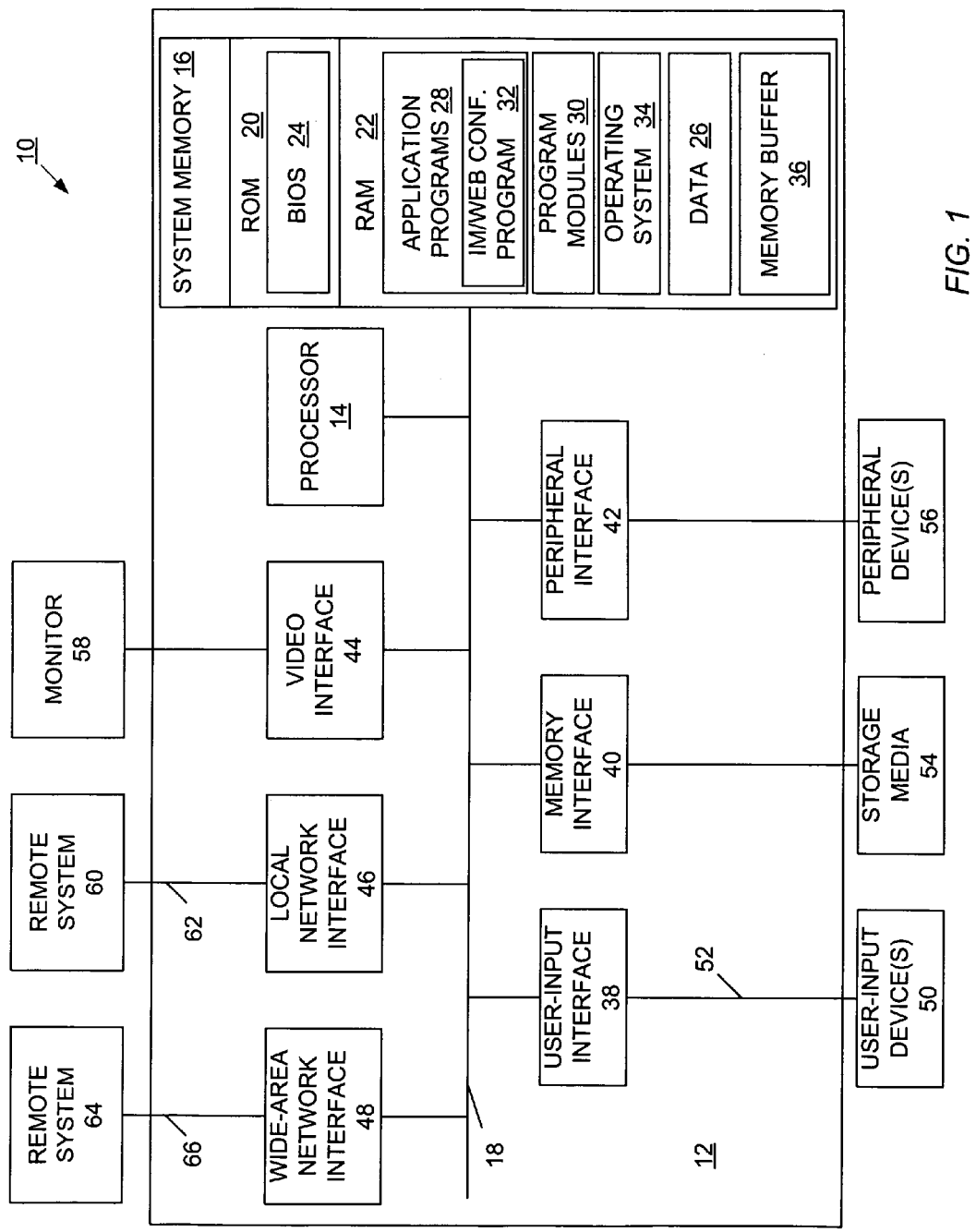
FIG. 1 is a block diagram of an exemplary computing environment in which aspects of the invention may be implemented.

Awareness service systems embodying the present invention enable a user to publish, automatically or manually, different awareness states (i.e., online presences) for different collaborative contexts at any given time. An awareness state refers to a particular online status of the user as seen by (or published to) another subscriber of the awareness service system. In general, the awareness state that a subscriber sees for the user depends upon the collaborative relationship that subscriber has with the user. This collaborative relationship is determined by the collaborative context of the user. A collaborative context comprises a plurality of individuals who are associated with one another to facilitate collaboration. A collaborative context can be a persistent context, for example, a defined group in a directory or a team with a defined membership, or a temporary context, such as the people participating in an electronic meeting.

Within a given collaborative context, the user can be unavailable for instant messaging (i.e., busy, do not disturb) with some people, but available to others. For example, while the user is participating in an electronic meeting (i.e., a web conference), the awareness state published to other participants of the electronic meeting is that the user is available, whereas the awareness state published to others who are not in the meeting indicates that the user is busy.

When someone sends an instant message to the user, the system embodying the invention detects the current activity (i.e., the collaborative context) of the user. For example, if the user is currently sharing the computer screen or moderating an electronic meeting, the system detects this activity and determines whether the user is accepting instant messages from this particular sender. If the user is not accepting this instant message, for example, because the sender is not in the same meeting as the user, the system automatically responds to the sender with a message to this effect. The user can rely on a default reply message or customize the contents of this reply message beforehand, choosing to customize the response, e.g., based on the particular sender or on the particular activity.

In addition, the user can publish different awareness (or presence) states at different times. With an online calendar, the user can establish a schedule that determines when the user is available, e.g., for instant messaging communications. In general, the online calendar establishes a temporal context that controls the user's awareness states as seen by different people at different times. The user allocates the various time slots of the calendar to different individuals and groups of people. If someone sends the user an instant message at a time that is not within a time slot allocated to that person, the system automatically sends a reply message to the sender. The system can also provide the user with a list of people who attempted to communicate with the user while the user was unavailable.

Systems embodying the invention may also provide additional identifying information about the sender of an instant message. For example, an instant message can tell the recipient user that the instant message is coming from an extranet, rather than from the corporate intranet, thus enabling the user to produce an appropriate reply. In these systems, the user can publish different awareness states to different people based on whether a person is on an extranet or on the intranet. The ability to publish different awareness states based on sender-identifying information can also extend to other types of organizational contexts (e.g., the person is a member of a particular department, team, or group in the corporation).

Other embodiments of the invention enhance the functionality of web conferences (also referred to electronic meetings and e-meetings). During a web conference, a participants list appears on the display screen of the meeting moderator (or on the screen of each participant). One embodiment displays information near the name of each participant, indicating the geographical location of that participant. This geographical information can be used to publish different awareness states to different people based on where a person is geographically located. In another embodiment, each participant may be able to post a message that only other participants in the meeting can read. The availability of this message is part of the awareness states published to the other meeting participants, but not part of the awareness states published to non-participants. When a participant posts the message, an indicator appears (e.g., an icon) near the name of the participant. Other participants can read the message by clicking on or hovering over the icon.

FIG. 1 shows an example of a computing environment 10 that can be used to practice embodiments of the present invention. The computing environment 10 includes a computing device 12 having a processor 14 in communication with system memory 16 over a system bus 18. Exemplary implementations of the computing device 12 include, but are not limited to, a personal computer (PC), a Macintosh computer, a workstation, a kiosk, a laptop computer, a server system, a handheld device such as a personal digital assistant (PDA) and a cellular phone, and a network terminal.

The system memory 16 includes non-volatile computer storage media, such as read-only memory (ROM) 20, and volatile computer storage media, such as random-access memory (RAM) 22. Typically stored in the ROM 20 is a basic input/output system (BIOS) 24, which contains program code for controlling basic operations of the computing device 12, including start-up of the computing device and initialization of hardware. Stored within the RAM 22 are program code and data 26. Program code includes, but is not limited to, application programs 28, program modules 30, and an operating system 34 (e.g., Windows 95, Windows 98, Windows NT 4.0, Windows XP, Windows 2000, Linux, and Macintosh).

Application programs 28 on the computing device 12 include, but are not limited to, an electronic mail client program, browser software, an instant messaging/web conferencing client program 32 (hereafter shortened to IM program 32), and office applications, such as spreadsheet, word processor, and slide presentation software Each application program 28 can be a proprietary or commercially available program, such as Lotus NOTES™ for email, Lotus Sametime™ or IBM Workplace™ for instant messaging and for web conferencing, Microsoft Internet Explorer™ for browser software, and Microsoft WORD™ for word processing. The browser software can incorporate a JAVA™ virtual machine for interpreting JAVA™ code (i.e., applets, scripts) and applications.

Through the IM program 32, a user connects to an awareness service system, such as an instant messaging/web conferencing system. The IM program 32 enables the user to exchange instant messages and participate in electronic meetings with other subscribers also connected online to the awareness service system. In accordance with the present invention, the user can publish different awareness states to other subscribers of the system based on different collaborative contexts. For example, the user can notify some of the other awareness service subscribers that the user is available for communicating by instant messaging, while notifying other subscribers that the user is unavailable for communicating by instant messaging, as described in more detail below. Although described herein as a single application program, the instant messaging/web conferencing client program 32 can comprise multiple distinct programs that execute independently or cooperatively.

The system bus 18 connects the processor 14 to various other components of the computing device 12, including a user-input interface 38, a memory interface 40, a peripheral interface 42, a video interface 44, a local network interface 46, and a wide-area network interface 48. Exemplary implementations of the system bus 18 include, but are not limited to, a Peripheral Component Interconnect (PCI) bus, an Industry Standard Architecture (ISA) bus, an Enhanced Industry Standard Architecture (EISA) bus, and a Video Electronics Standards Association (VESA) bus.

Over a wire or wireless link 52, the user-input interface 38 is in communication with one or more user-input devices 50, e.g., a keyboard, a mouse, trackball, touch-pad, touch-screen, microphone, joystick, by which a user can enter information and commands into the computing device 12. The memory interface 40 is in communication with removable and non-removable non-volatile storage media 54. Examples of removable and non-removable non-volatile storage media include, but are not limited to, hard disks, optical disks such as CD ROMs, magnetic diskettes, and flash memory cards. Peripheral devices 56, e.g., printers, speakers, scanners, connect to the system bus 18 through the peripheral interface 42 and a display monitor 58 connects to the system bus 18 through the video interface 44.

The computing device 12 can be part of a network environment. Examples of network environments include, but are not limited to, local-area networks (LAN), metro-area networks (MAN), and wide-area networks (WAN), such as the Internet or World Wide Web. For connecting to a remote system 60 on a LAN, the computing device 12 can use the local network interface 46 over a logical connection 62. To connect to a remote system 64 on a WAN, the computing device 12 can use the wide-area network interface 48 over a logical connection 66. Examples of remote systems 60, 64 include, but are not limited to, Web servers, e-mail servers, application servers, directory servers, instant messaging/web conferencing servers, routers, and personal computers. The computing device 12 can connect to the remote system 60, 64 through one of a variety of connections, such as standard telephone lines, digital subscriber line, LAN or WAN links (e.g., T1, T3), broadband connections (Frame Relay, ATM), and wireless connections (e.g., 802.11(a), 802.11(b), 802.11 (g)).

During operation, a user goes "online" by launching the IM program 32 and logging onto the awareness service system. In accordance with the present invention, the user publishes multiple awareness states (i.e., online statuses) based on various attributes (e.g., another user's location, an LDAP (Light Directory Access Protocol) group, interacting with a corresponding activity), to establish different online status settings (awareness states) for different collaborative contexts.

When determining which awareness state to publish to a given subscriber, the awareness service system matches the name of the message-sending subscriber with the collaborative contexts associated with the user. In one embodiment, the awareness state that is reported to the subscriber is the one that makes the user more or most available. For instance, if the subscriber is a member of a first group to which the user is available and a member of a second group to which the user is unavailable, the awareness state published to the subscriber is available.

For example, a user, Jane, logs on and publishes her online status twice. In the first publication, she reports her online status as "Available," and sets the collaborative context to an electronic meeting in which she is participating. In the second publication, she sets her online status to "Do Not Disturb," and does not specify a collaborative context. When Peter who is in the same electronic meeting subscribes to receive Jane's online status, he receives notice that Jane is "Available". When Paul, who is not in that electronic meeting, subscribes to receive Jane's online status, he receives notice that her online status is "Do Not Disturb."

In addition, a user can publish an online status for many different collaborative contexts at a given time. For example, Mary may publish an online status of "Available" to an LDAP group defining her department and to two different teams participating in projects that she is actively working on. She may also publish an online status of "Do Not Disturb" to an LDAP group that defines the sales organization. If a subscriber is on one of the teams and in the sales organization, that subscriber sees her online status as "Available." Any subscriber not in Mary's department, as defined by the LDAP group, or on any one of the teams, receives Mary's online status as "Offline."

User Activity Context

Figure 2:
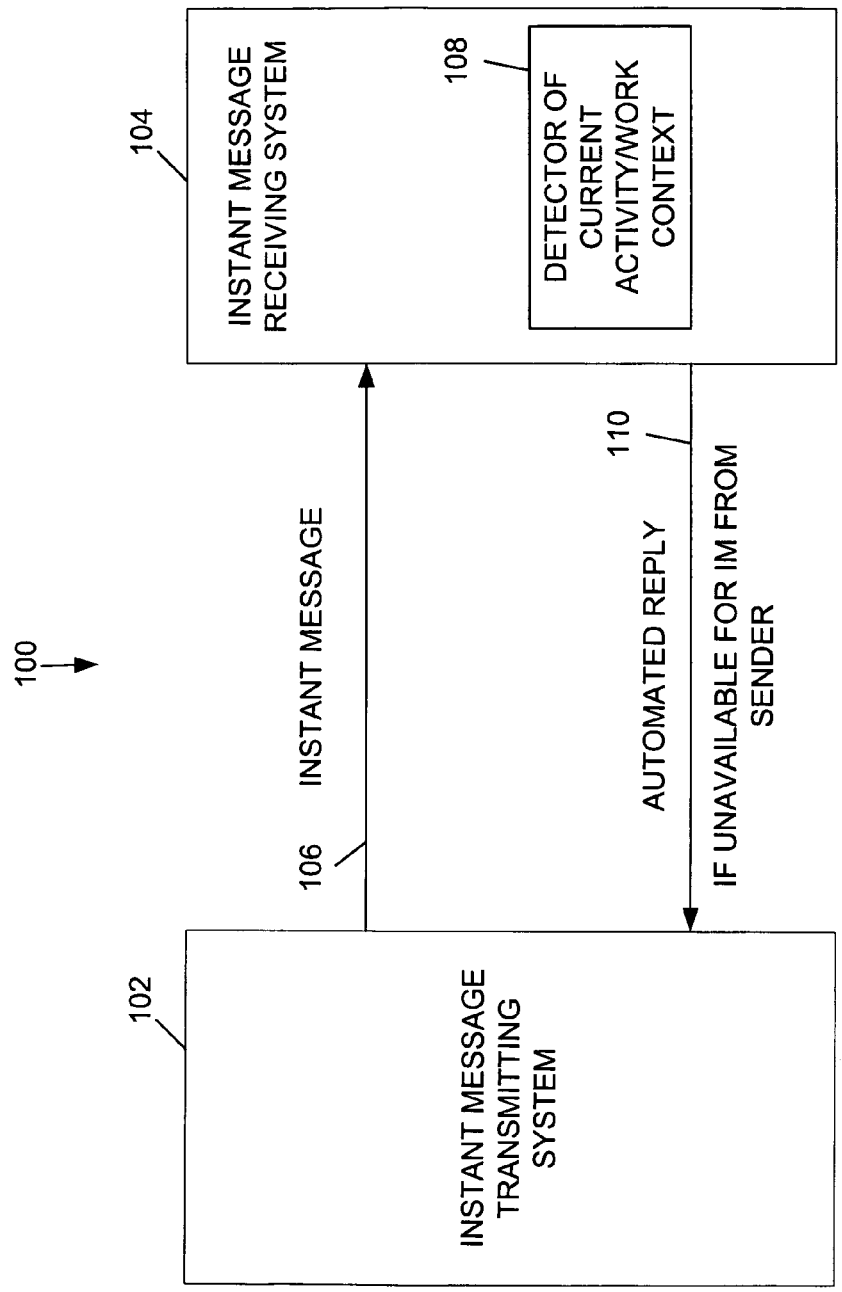
FIG. 2 is a block diagram an embodiment of an awareness service system embodying the invention for managing interruptions based on the current activity (i.e., collaborative context) of the user.

FIG. 2 shows an embodiment of awareness service system 100 incorporating the invention for managing interruptions based on the current activity of the user. The awareness service system 100 includes an instant message (IM) transmitting system 102 and an IM receiving system 104. An instant message 106 passes from the IM transmitting system 102 to the IM receiving system 104.

The IM receiving system 104 executes detector software 108 for automatically detecting the current activity of the targeted recipient of the instant message 106. In one embodiment, the detector software 108 is embodied in the IM program 32 (FIG. 1). If the targeted recipient is engaged in an activity that should not be interrupted (e.g., the user is moderating a meeting, sharing the display screen, teaching an online course, participating in a safety critical activity, or taking screen control from another user), the IM receiving system 104 automatically sends a contextually appropriate message 110 to the sender of the instant message.

For the contextually appropriate message, the IM receiving system 104 can use a default message, such as "In a meeting." Alternatively, the user can customize a specific message. In one embodiment, an Option Menu of the instant messaging application program 32 has a menu item, e.g., "Edit Current Status Message", through which the user can select one of several predetermined messages, such as "I am away," "Please do not disturb," and "I am currently unavailable." Through this Option Menu selection, the user can edit the default message or customize a message. The user can also turn on or off an "auto detect" feature associated with the default and each custom message, depending upon whether the user wants to put that particular message into operation. Thereafter, the IM receiving system 104 automatically generates a reply message using the default message or an appropriate custom message, without any intervention from the user.

Consider, for example, a user of the awareness service system 100 named Grace, who is a Manager at Delta Pacific Bank and has several teams reporting to her. (In this example, Delta Pacific Bank is a fictional worldwide corporation employing over 100,000 people). Grace likes to track her team's progress, asking team members for regular updates on their work and to keep her apprised on any issues or problems that arise. In addition, Grace runs an electronic meeting for a Global Customer Care Program of the Delta Pacific Bank. While Grace is delivering a presentation during the electronic meeting, Jin Wu, one of her team members, sends her an instant message saying that a customer complaint was not being handled appropriately. In addition, another of her colleagues in the meeting, Vince, sends Grace an instant message to tell her that she is moving through her slides in the presentation too quickly.

To prevent Jin's message from inappropriately appearing on Grace's computer screen during the electronic meeting, where others in the electronic meeting can see that message, Grace can perform one of the following sequences to pre-configure the IM receiving system 104: 1) she can enter the Option Menu, select "Edit Current Status Message," and select a message from one of the pre-defined choices, or 2) she can enter the Option Menu, select "Edit Current Status Message," and add her own custom message: "I am in a meeting until 3:00 PM EST. Send me an e-mail if urgent or try me again later." or (3) do nothing, whether intentionally or unintentionally, thereby enabling the IM receiving system 104 to detect Jin's incoming instant message and to respond to Jin with the default message. When Grace checks later on, she will see that Jin tried to communicate with her.

Accordingly, when the IM receiving system 104 receives Jin's incoming instant message, the system 104 detects Grace's current activity, determines that Jin is not a participant in the meeting or in any predefined group of people from which instant messages are currently accepted, and produces a reply message. In addition, the instant message from Jin does not appear on Grace's display screen for all other meeting participants to see. Meanwhile, the configuration of the IM receiving system 104 allows Grace to continue receiving instant messages from people in the electronic meeting, such as the instant message from Vince.

User Schedule Context

Figure 3:
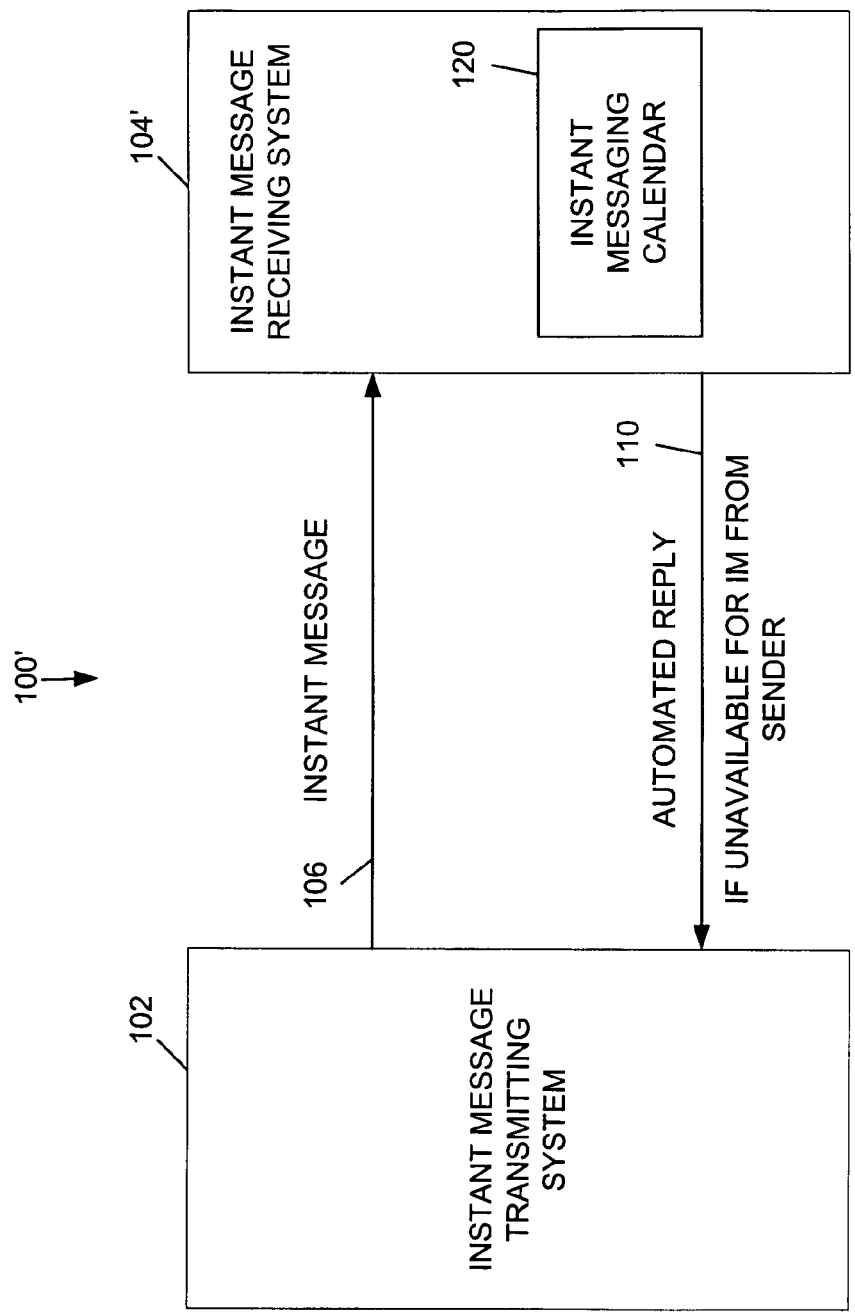
FIG. 3 is a block diagram an embodiment of an awareness service system embodying the invention for managing interruptions based on an instant messaging schedule established by the user.

FIG. 3 shows another embodiment an awareness service system 100' embodying the invention for managing instant messaging communications based on an instant messaging schedule established by the user. The awareness service system 100' includes the IM transmitting system 102 (FIG. 2) and an IM receiving system 104'. An instant message 106 passes from the IM transmitting system 102 to the IM receiving system 104'.

The awareness service system 100' uses a particular capability of the IM program 32 (FIG. 1) that allows a user to control who can see when the user goes online. This capability, in combination with an online IM calendar program 120, enables the user to establish "office hours," i.e., particular periods in the day and days in the week during which the user is willing to accept instant messages. In addition, the user can allocate these periods of availability to designated individuals, groups of individuals, intranet members, or select extranet members. A feature of the calendar program enables the user to repeat automatically one or more of the calendar settings on a daily, weekly, or monthly basis. The user can view the time slot allocations through the IM calendar program 120. The IM calendar program 120 may be part of the IM program 32. In addition, the IM calendar program 120 can be independent of and distinct from any other calendar programs, such as those typically embodied in e-mail applications (e.g., as Lotus Notes™).

If the instant message 106 arrives at the IM receiving system 104' during an out-of-office time slot, the sender of the message 106 receives a message 110 in reply saying that the user is not available. In addition, the instant message 106 does not appear on the display screen of the user. In one embodiment, the IM receiving system 104' detects that the sender of the instant message 106 has assigned office hours at another time slot in the schedule. In this instance, the reply message can inform the sender of those next office hours.

In another embodiment, the system informs the individuals and groups when a user is "in," i.e., available to that individual or group. The user can append an "announcement" in the calendar for each group and individual. Individuals can read the announcements to determine how the user has allocated the various time slots, and which time slots are specifically allocated to them. The calendar program 120 permits the user to list exceptions to the office hours so that instant messages from certain people (e.g., a particular manager) are displayed irrespective of when they are arrive.

For example, Grace communicates with most people at Delta Pacific-Bank though instant messaging, but finds that the instant messaging frequently interrupts her work. She decides to establish instant messaging "office hours" and notifies people of their specific office hours during which they can communicate with her through instant messaging.

To establish these office hours, Grace accesses the calendar program 120, which provides a user interface displaying Grace's contact list containing predefined groups and group members. Grace then assigns time slots in the calendar to different groups and individuals. Through email messages, the group members receive notice of their office hours. These group members can access the calendar and see the time slots assigned to the groups of which they are a member. If someone tries to send an instant message to Grace outside of an assigned time slot, the sender receives a message to the effect saying, "Grace is unavailable. Please send e-mail. Next Office Hours are at . . . ."

The following is an example of an instant messaging calendar that establishes instant messaging office hours ("Rep" identifies a Repeating meeting):

| Time | Monday 2/23 | Tuesday 2/24 | Wednesday 2/25 | Thursday 2/26 | Friday 2/27 |
| --- | --- | --- | --- | --- | --- |
| 9:00 | UEXP group only | | | | Bill Richards Rep |
| 10:00 | UEXP group only | | | | |
| 11:00 | | | | Development Team | |
| 12:00 | | | | | |
| 1:00 | Intranet only | | | | |

-continued

| Time | Monday 2/23 | Tuesday 2/24 | Wednesday 2/25 | Thursday 2/26 | Friday 2/27 |
|---|---|---|---|---|---|
| 2:00 | June Rainer<br>Marcus Healy<br>Nina Desai | | June Rainer<br>Marcus Healy<br>Nina Desai | | June Rainer<br>Marcus Healy<br>Nina Desai |
| 3:00 | | Manager Rep | | | |
| 4:00 | | | | | |
| 5:00 | | | | | |

According to this calendar schedule, Bill Richard's time slot occurs every Friday morning, from 9 AM to 10 AM. As another illustrative example, the user is accepting instant messages from any member of the UEXP group on February 23, from 9 AM until 11 AM. Further, three specifically identified individuals have office hours from 2 PM to 3 PM on the twenty-third, twenty-fifth, and twenty-seventh of February.

Organizational Context

Many organizations work closely with their customers, partners, and suppliers, and desire to communicate with them using instant messaging. Users often prefer to distinguish intranet users from such extranet users in their contact list. One embodiment of the awareness service system provides a clear distinction in the contact list between intranet and extranet users. This embodiment provides a visual indicator that alerts the user when an instant message is from an extranet user. For example, an "EXT" extension, icon, category (intranet, extranet), color, or title can appear in the chat window so the user knows more specifically the identity of the person who sent the instant message. Because instant messaging chats tend to be rapid and informal, this identification serves to alert the user, who can take the opportunity to be more formal when preparing a reply.

For example, consider Grace's company, Delta Pacific Bank, a fictional worldwide corporation employing over 100,000 people. As a manager, Grace is involved with many of the bank's customers; she presents new products, helps troubleshoot problems, and communicates with the bank's top tier customers frequently. One morning, Grace receives an instant message from an individual named Mark Brown, asking about the new benefits for members of the Customer Care program. Grace does not personally know Mark Brown and does not know whether he is an employee of the bank or a customer. If she can determine that Mark Brown is a bank employee, she can send him the latest draft of the proposed benefits for the Customer Care program. On the other hand, if Mark Brown is a customer, she can answer his questions differently, divulging only that information regarding the Customer Care program that is presently approved for public dissemination. An attempt to find Mark Brown in her company's LDAP, however, uncovers 12 people by that name, and provides little help.

One embodiment of the awareness service system determines from an address associated with of the incoming instant message, such as the Universal Resource Locator (URL), that Mark Brown is an extranet user and displays an "EXT" adjacent to Mark Brown's name. Alternatively, the "EXT" identifier can appear when the cursor hovers over Mark Brown's name in the chat window. This indicator provides Grace with sufficient information to construct her response appropriately.

Instead of, or in addition to providing indicators to distinguish between extranet and intranet users, other embodiments of the awareness service system can use indicators to identify team, group, departmental, and organizational boundaries within the intranet, e.g., providing an extension signifying that the sender of the instant message is a member of the sales department or of the marketing department. The indicators enable the instant messaging system to determine an organizational context (i.e., collaborative relationship) of the sender of the instant message with respect to the user. The different organizational contexts allow the user to publish different awareness states to people in different organizations (e.g., sales department, marketing department, extranet, intranet). For example, the user can publish a first awareness state of "available" to members of the sales department, and a second awareness state of "do not disturb" to members of the marketing department.

One-Time Meeting Messages

Occasionally, while working within a particular collaborative context, such as an electronic meeting or online class, a user desires to post a message specifically directed to the other participants of the collaborative context, but to no one else outside of this context. For example, a participant in an electronic meeting may want to post a message to the other meeting attendees, without people outside of the meeting being able to view the message. One embodiment of the awareness service system enables a participant of an online collaborative activity to produce and post such a message that other participants can discover and read.

When such a participant posts a message, an icon appears adjacent to the name of that participant (i.e., the icon becomes part of the awareness state published by this participant). The other participants of the collaborative activity, seeing the icon, can view the message by moving the cursor over it (i.e., hover). Indicators other than an icon can be used to indicate that a participant has posted a message. For example, the name of the user can appear in a different font (e.g., italics, bold, underlined, etc.). For individuals who are not participating in the collaborative activity, the user publishes one or more different awareness states, i.e., such individuals do not see the icon or, if the icon appears, they cannot read the message.

Consider the following exemplary scenario. When Grace works from home, she establishes a status message leaving her home phone number so that people know her work location and how to call her, (e.g., Working at Home today: 555-555-5555). This status message is available to anyone online (i.e., connected to the awareness service system) in her company. While in an electronic meeting, she wants to remind the other participants to send her agenda items for an upcoming staff meeting. She can announce this during the electronic meeting, but uses the message posting mechanism as a way to remind people. In one embodiment, a menu item in the Options Menu of the IM program 32 enables Grace to post this message. During the electronic meeting, the other participants see—on their own display screens—an icon appear next to Grace's name in the participants list. When a participant hovers over this icon, the posted status message appears, "Please send me your agenda items for the staff meeting by end-of-business today." To those subscribers of Grace's online status who are not in the electronic meeting, the icon does not appear on their display screens. Alternatively, the icon may appear, but the corresponding message cannot be read by hovering or otherwise.

Location-Based Context

During an electronic meeting, it may be useful to know the geographical location of a particular participant. Individuals within an organization may travel often or transfer to a different city or group. Rather than having to spend time during the meeting asking where everyone is located, one embodiment of the awareness service system automatically provides an indication of the geographical location of each participant in the displayed participants list. This location information can be made available to the meeting moderator only (by default), or shared with all participants in the electronic meeting. The moderator can choose to hide this location information and have the information become available on hover only, or the information can appear under each participant's name.

Consider the following exemplary scenario. Grace launches a new program at Delta Pacific Bank, called the Global Customer Care Program. She seeks approval from two major geographical regions in her company: the Americas and EMEA (i.e., Europe, Middle East, and Asia). She circulates the proposal for approval and receives back comments through e-mail. Subsequently, she decides to schedule a meeting to review the proposal with as many people as possible. Accordingly, she schedules a meeting and invites 40 people from the different geographical regions and business units. Some invited people delegate their participation, so Grace is not familiar with everyone attending her electronic meeting.

When Grace logs into the electronic meeting, she sees a long participants list. Not being familiar with all of the names, she would normally need to do a roll call, asking people to introduce themselves and state their geographical location and business unit, to make sure that there is adequate representation from each geographical location. Using the awareness service system of the invention, Grace can view the location information for each participant, which, in one embodiment, is displayed below each name.

In one embodiment, the user can enter the location information into the awareness service system. In another embodiment, the location information includes Global Position System (GPS) information, including the latitude and longitude coordinates of a participant in the electronic meeting. This participant possesses a GPS tracking device that obtains and supplies the GPS coordinate information to the enterprise network, which can store the GPS information and other personal data for retrieval by the awareness service system. The GPS coordinate information can appear on the participants list under the name of each participant, or when the cursor hovers over the name.

Geographical information, whether entered manually or through a GPS device, serves as another type of collaborative context that the awareness service system can detect. Based on geographical information, the user can publish different awareness states to people located in different geographies. For example, the user can publish a first awareness state of "available" to individuals situated in North America, and a second awareness state of "do not disturb" to individuals situated in Europe.

The present invention may be implemented as one or more computer-readable software programs embodied on or in one or more articles of manufacture. The article of manufacture can be, for example, any one or combination of a floppy disk, a hard disk, hard-disk drive, a CD-ROM, a DVD-ROM, a flash memory card, an EEPROM, an EPROM, a PROM, a RAM, a ROM, or a magnetic tape. In general, any standard or proprietary, programming or interpretive language can be used to produce the computer-readable software programs. Examples of such languages include C, C++, Pascal, JAVA, BASIC, Visual Basic, and Visual C++. The software programs may be stored on or in one or more articles of manufacture as source code, object code, interpretive code, or executable code.

Although the invention has been shown and described with reference to specific preferred embodiments, it should be understood by those skilled in the art that various changes in form and detail may be made therein without departing from the spirit and scope of the invention as defined by the following claims. For example, instant messaging/web conferencing systems embodying the invention can employ any one or any combination of the above-described features. Further, other types of systems that provide awareness services (i.e., not just an instant messaging and web conferencing systems) can employ the present invention.

What is claimed is:

1. A computerized method for managing communications by a user of a computing device who participates in an awareness service system, the method comprising:

receiving instant messages (IM) directed to the user for immediate display on the computing device of the user;

determining, in response to each received instant message, a current activity of the user;

determining, for each received instant message, a collaborative relationship between the user and a sender of that received instant message within context of this current activity;

determining, in response to the collaborative relationship determined for a given received instant message, whether the user is currently available to accept instant messages from the sender of the given instant message; and in response to determining that the user is currently unavailable to accept instant messages from the sender of the given instant message, preventing the given instant message from appearing on a display of the computing device of the user and sending an automated reply message related to the currently unavailability of the user to the sender of the given instant message.

2. The method of claim 1, wherein the current activity of the user is that the user is currently participating in an electronic meeting.

3. The method of claim 1, further comprising the step of establishing a schedule for when the user is available to receive instant messages.

4. The method of claim 3, wherein the schedule identifies a time slot during which the user is available to receive an instant message from a particular individual.

5. The method of claim 3, wherein the schedule identifies a time slot during which the user is available to receive an instant message from a defined group of individuals.

6. The method of claim 1, further comprising the steps of providing, in the given instant message, identification information about the sender of the given instant message and publishing an IM awareness state to the sender of the given instant message based on the identification information.

7. The method of claim 6, wherein the identification information indicates that the sender of the given instant message is a member of an extranet.

8. The method of claim 6, wherein the identification information indicates that the sender of the given instant message is a member of a department within an organization.

9. The method of claim 1, further comprising the steps of displaying a list of participants in an electronic meeting and providing an indicator adjacent to a name of one participant on the list, the indicator signifying that the participant has posted a message, the message being viewable only by each participant of the IM awareness service system who is an attendee of the electronic meeting.

10. The method of claim 1, further comprising the steps of displaying a list of participants in an electronic meeting and providing an indicator adjacent to a name of one participant on the list, the indicator providing location information identifying a geographical location of that one participant.

11. The method of claim 10, wherein the location information includes Global Positioning System information.

12. The method of claim 10, further comprising the step of publishing an IM awareness state to that one participant based on the location information.

13. The method of claim 1, further comprising presenting to the user a list of senders who attempted to send an instant message to the user while the user was currently unavailable to accept instant messages from such senders.

14. An awareness service system, comprising:
an instant messaging (IM) system receiving instant messages directed to a user for immediate display on a computing device of the user, the instant messaging system including a processor programmed to:
determine, in response to each received instant message, a current activity of the user and a collaborative relationship between the user and a sender of that received instant message within context of this current activity;
determine, in response to the collaborative relationship determined for a given received instant message, whether the user is currently available to accept instant messages from the sender of the given instant message; and
in response to determining that the user is currently unavailable to accept instant messages from the sender of the given instant message, prevent the given instant message from appearing on a display of the computing device of the user and sending an automated reply message related to the currently unavailability of the user to the sender of the given instant message.

15. The awareness service system of claim 14, wherein the instant messaging system includes a calendar system for establishing a schedule for when the user is available to receive instant messages.

16. The awareness service system of claim 15, wherein the schedule specifies a time slot during which instant messages from a particular participant are acceptable.

17. The awareness service system of claim 14, wherein the instant messaging system provides, in the given instant message, identification information about the sender of the given instant message and publishes an IM awareness state to the sender of the given instant message based on the identification information.

18. The awareness service system of claim 17, wherein the identification information indicates that the sender of the given instant message is a member of an extranet.

19. The awareness service system of claim 17, wherein the identification information indicates that the sender of the given instant message is a member of a department within an organization.

20. The awareness service system of claim 14, wherein the instant messaging system displays a list of participants in an electronic meeting and provides an indicator adjacent to a name of one participant on the list, the indicator signifying that the participant has posted a message, the message being viewable only by each participant of the awareness service system who is an attendee of the electronic meeting.

21. The awareness service system of claim 14, wherein the instant messaging system displays a list of participants in an electronic meeting and provides an indicator adjacent to a name of one participant on the list, the indicator providing location information identifying a geographical location of that participant, the instant messaging system publishing an IM awareness state to that one participant based on the location information.

22. The awareness service system of claim 14, wherein the instant messaging system presents to the user a list of senders who attempted to send an instant message to the user while the user was currently unavailable to accept instant messages from such senders.

23. A computer program product for use with a computer system for managing communications by a user of a computing device who participates in an instant messaging (IM) system, the computer program product comprising a computer-readable non-transitory storage medium having computer-readable program code embodied therewith, the computer-readable program code comprising:
computer-readable program code configured to receive instant messages directed to the user for immediate display on the computing device of the user;
computer-readable program code configured to determine, in response to each received instant message, a current activity of the user and a collaborative relationship between the user and a sender of that received instant message in this current context;
computer-readable program code configured to determine, in response to the collaborative relationship determined for a given received instant message, whether the user is currently available to accept instant messages from the sender of the given instant message; and
computer-readable program code configured to prevent the given instant message from appearing on a display of the computing device of the user and to send an automated reply message related to the currently unavailability of the user to the sender of the given instant message, in response to determining that the user is currently unavailable to accept instant messages from the sender of the given instant message.

24. The computer program product of claim 23, further comprising computer-readable program code configured to present to the user a list of senders who attempted to send an instant message to the user while the user was currently unavailable to accept instant messages from such senders.

* * * * *